(12) United States Patent
Linggajaya et al.

(10) Patent No.: US 7,800,324 B2
(45) Date of Patent: Sep. 21, 2010

(54) CONTINUOUS MODE VELOCITY CONTROL OF VOICE COIL MOTOR

(75) Inventors: Kaufik Linggajaya, Singapore (SG); Hin Sing Fong, Singapore (SG)

(73) Assignee: STMicroelectronics Asia Pacific Pte. Ltd., Singapore (SG)

( * ) Notice: Subject to any disclaimer, the term of this patent is extended or adjusted under 35 U.S.C. 154(b) by 217 days.

(21) Appl. No.: 12/069,686

(22) Filed: Feb. 12, 2008

(65) Prior Publication Data

US 2008/0198499 A1    Aug. 21, 2008

Related U.S. Application Data

(60) Provisional application No. 60/902,586, filed on Feb. 21, 2007.

(51) Int. Cl.
*H02P 6/00* (2006.01)

(52) U.S. Cl. .................................. 318/400.01; 388/804

(58) Field of Classification Search .................. 388/804, 388/806; 318/400.01, 439, 799, 621, 618, 318/632; 360/78.06
See application file for complete search history.

(56) References Cited

U.S. PATENT DOCUMENTS

| | | | | |
|---|---|---|---|---|
| 4,345,194 | A | * | 8/1982 | Green ........................ 318/621 |
| 2002/0054451 | A1 | * | 5/2002 | Moon et al. .............. 360/78.06 |

* cited by examiner

*Primary Examiner*—Karen Masih
(74) *Attorney, Agent, or Firm*—Lisa K. Jorgenson; William A. Munck

(57) ABSTRACT

A method of controlling the velocity of a voice coil motor (VCM), including sensing a voltage difference between the VCM and a sense resistor and driving a velocity control loop (VCL) based on the voltage difference. There is also a control loop circuit, including a current output connected to drive a voice coil motor, the voice coil motor producing a back electromagnetic field (BEMF) voltage. The circuit also includes a sense resistor connected to the BEMF output, and a BEMF resistive network comprising a first resistor and a second resistor. The circuit also includes a velocity control loop (VCL) connected to control the voltage output according to a voltage difference between (i) a junction of the sense resistor and the current output and (ii) a junction of the first resistor and the second resistor.

20 Claims, 2 Drawing Sheets

US 7,800,324 B2

CONTINUOUS MODE VELOCITY CONTROL OF VOICE COIL MOTOR

CROSS REFERENCE TO RELATED APPLICATION

This application claims the benefit of the filing date of U.S. Provisional Patent Application 60/902,586, filed Feb. 21, 2007, which is hereby incorporated by reference.

TECHNICAL FIELD

The present disclosure relates generally to hard disk drives and, in particular, to systems and methods for controlling voice coil motors.

BACKGROUND

A hard disk drive includes a disk on which data is stored, a spindle motor which rotates the disk, a read/write head, and a voice coil motor (VCM) to move the head over the disk for reading/writing from/to the disk surface. When the disk is not rotating, the VCM moves the head away from the disk area. When the disk is rotating, and read/write operations are in progress, the head, which is carried on a VCM arm, is positioned above the data storage surface of the disk. When the disk is not rotating, the head is moved away from the disk in order to prevent any damage to the disk.

Conventional systems generally use two methods or modes for controlling the velocity of VCMs, continuous and discontinuous mode.

Conventional discontinuous mode methods generally drive the VCM motor using Pulse Width Modulation (PWM). During the PWM off-state, the back electromagnetic field (BEMF) voltage appearing across the VCM motor is sensed. The BEMF voltage information is used to determine the power required to drive the VCM motor in the next cycle. Conventional methods using discontinuous modes mandate that the PWM frequency be in the audible range. This is typically due to the L/R constant of the inductive motor and requirements for sufficient off-time to sense the BEMF effectively.

For conventional continuous mode methods, a constant voltage is applied across the VCM motor. Thus, the motor maximum velocity is limited. Such methods do not control the velocity effectively. Often times, the voltage includes the BEMF and voltage across the motor resistance (Rm). Another conventional method senses the motor current through the sense resistor (Rs) and voltage across the VCM motor. This information is then used to calculate the VCM motor resistance and the actual BEMF.

It is generally important that there exists a precise control over the velocity of the actuator in a Hard Disk Drive (HDD). Most conventional methods control the Voice Coil Motor (VCM) during the load/unloading operation of HDDs with ramp load features. Such control enables the actuator to transit onto or off the ramp without damaging the HDD by preventing crashes against the media or ramp in high speeds.

To achieve good velocity control, it is generally important to extract the VCM back electromagnetic field (BEMF) voltage and the motor resistance accurately. This is typically very difficult because motor resistances generally vary with respect to temperature and the torque required as the arm is brought up and down the ramp.

There is therefore a need for improved systems and methods for controlling voice coil motors.

SUMMARY

A disclosed embodiments includes a method of controlling the velocity of a voice coil motor (VCM), including sensing a voltage difference between the VCM and a sense resistor and driving a velocity control loop (VCL) based on the voltage difference.

Another embodiment includes a control loop circuit, including a current output connected to drive a voice coil motor, the voice coil motor producing a back electromagnetic field (BEMF) voltage. The circuit also includes a sense resistor connected to the BEMF output, and a BEMF resistive network comprising a first resistor and a second resistor. The circuit also includes a velocity control loop (VCL) connected to control the voltage output according to a voltage difference between (i) a junction of the sense resistor and the current output and (ii) a junction of the first resistor and the second resistor.

Another embodiment includes a hard disk drive. The hard disk drive includes a storage disk, and a voice coil motor (VCM) connected to operate a VCM arm for reading the storage disk. The hard disk drive also includes a VCM control circuit including a control loop circuit connected to control the VCM, as described herein.

Other technical features may be readily apparent to one skilled in the art from the following figures, descriptions and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

The present disclosure is generally related to the hard disk drive (HDD) voice coil motor (VCM) ramp load/unload operation. In one embodiment, the present disclosure provides a system and method for controlling the VCM velocity during ramp load/unload operation to avoid crashing the read/write head onto the media.

Figure 1:
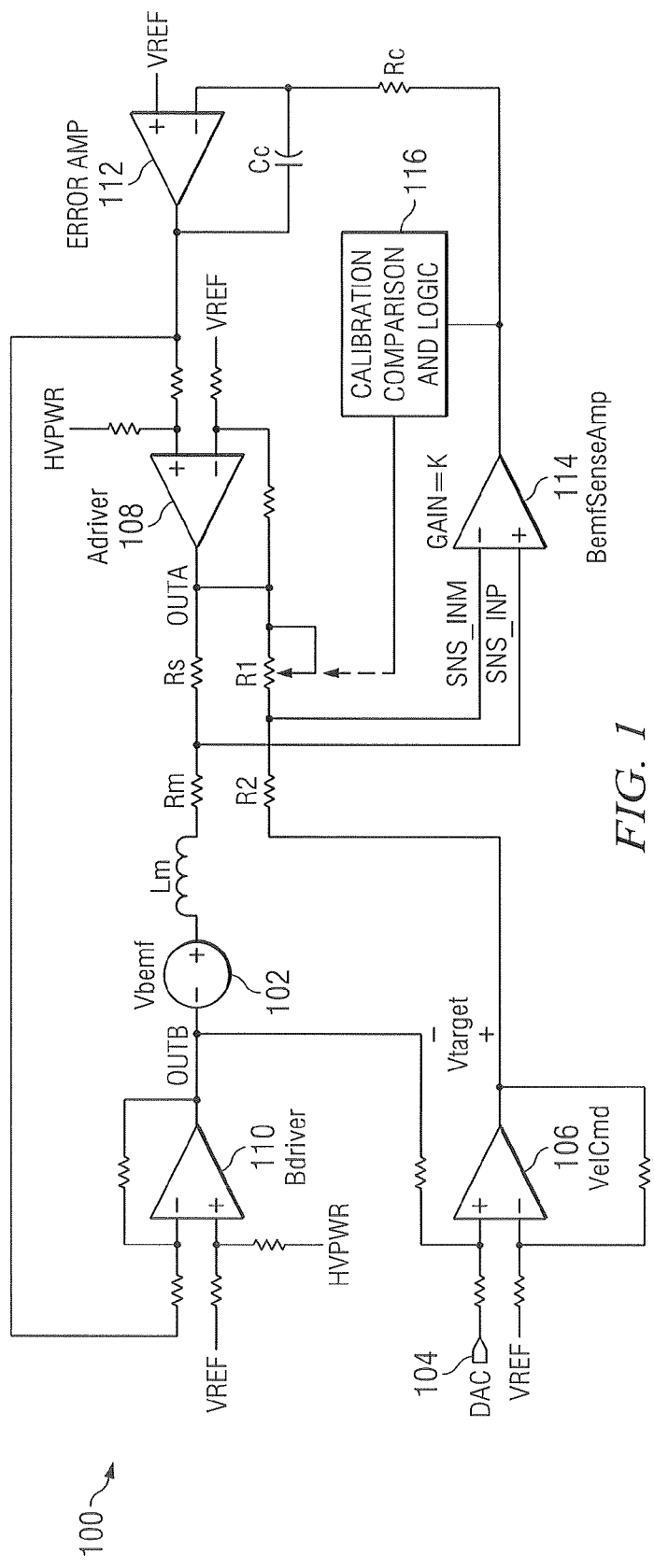
FIG. 1 is a simplified circuit diagram illustrating a continuous velocity control loop according to one embodiment of the present disclosure.

FIG. 1 is a somewhat simplified circuit diagram of continuous velocity control loop 100 according to one embodiment of the present disclosure. Control loop 100 generally includes a back electromagnetic field (BEMF) voltage (Vbemf) 102 produced by a VCM driven by an output current, a digital-to-analog converter (DAC) 104 and five amplifiers—velocity command amplifier (VelCmd) amplifier 106, driver amplifier (Adriver) 108, driver amplifier (Bdriver) 110, error amplifier (Error Amp) 112, and BEMF sensing amplifier (BemfSenseAmp) 114. Control loop 100 also includes calibration comparison and logic block 116.

Control loop 100 shown in FIG. 1 is for illustration purposes only and may include various other suitable components, such as resistors, inductors and capacitors. Any one or more of the above-described amplifiers may be, for example, operational amplifiers.

Control loop 100 generally controls BEMF voltage (Vbemf) 102, produced by a VCM driven by an output current, by means of an input to DAC 104. The voltage at DAC 104 is generally level shifted to produce Vtarget using Vel-Cmd amplifier 106. As an example, when DAC 104 provides a positive command, Vtarget causes the voltage at the negative input of BemfSense amplifier 114 (i.e., node SNS_INM) to go higher, which in turn causes the output of BemfSense amplifier 114 to go lower.

In this figure, BEMF voltage (Vbemf) 102 is produced by a VCM driven by an output current from OUTA to OUTB, and resistor Rm represents the VCM motor resistance ratio. Resistor Rs acts as a sense resistor, and R1 and R2 together form a back electromagnetic field (BEMF) resistor network. Note that particular resistors are not necessarily only a single device, but can be implemented as a plurality of resistors, as known to those of skill in the art.

Error amplifier 112 accumulates the error causing the VCM drivers, such as Adriver 108 and Bdriver 110, to produce more current from OUTA to OUTB. As the current rises, the VCM moves and develops the BEMF voltage, the voltage at positive input of BemfSense amplifier 114 (i.e., node SNS_INP) also increases, until it matches the voltage at the negative input of BemfSense amplifier 114 (i.e., node SNS_INM). When the two voltages match, Vbemf 102 of the motor will be equal to Vtarget. On the other hand, if DAC 104 provides a negative command, DAC 104 produces an inverted polarity Vbemf 102 which eventually causes the VCM to move in the opposite direction. Thus, by changing the polarity of DAC 104, bidirectional control of the VCM is achieved. In addition, in one embodiment, the present disclosure provides the ability to conduct multilevel velocity control by using different settings for DAC 104 to get out of a latch and by traversing across the ramp and media.

The voltage across OUTB and OUTA at steady state are given by the relationships illustrated by Equations 1 and 2 below.

$$SNS\_INP = (OUTB + Vbemf) * \frac{Rs}{Rs + Rm} + OUTA\left(1 - \frac{Rs}{Rs + Rm}\right) \quad \text{(Eqn. 1)}$$

$$SNS\_INM = (OUTB + Vtarget) * \frac{R1}{R1 + R2} + OUTA\left(1 - \frac{R1}{R1 + R2}\right) \quad \text{(Eqn. 2)}$$

Now, assuming that BemfSense amplifier 114 has a zero (0) offset, control loop 100 will force the voltage at positive input of BemfSense amplifier 114 (i.e., node SNS_INP) to equal the voltage at the negative input of BemfSense amplifier 114 (i.e., node SNS_INM). Assuming that R1/R2=RS/RM, the relationship illustrated by Equation 3 below results.

$$Vbemf = Vtarget = VelCmd \, OpAmp \, Gain*DAC \quad \text{(Eqn. 3)}$$

The gain at VelCmd amplifier 106 is typically set to one (1). Equations 1, 2 and 3 above generally illustrate that information regarding Rs/Rm can aid in selecting values for R1 and R2 to close the loop. It is noted that Rm cannot be measured directly and changes with temperature as the HDD operates. Accordingly, in one embodiment, the present disclosure provides a method including a simple calibration mode.

In one embodiment, calibration is performed by by driving the VCM in either current control loop (CCL) or VCL, against the crash stop at the top of the ramp before starting the ramp load/unload operation and then setting Vtarget to zero (0). Thus, the motor is not moving when Vbemf 120 and Vtarget are both equal to zero. Using known resistor network principles and techniques, it is found that R1/R2=Rs/Rm if the positive input of BemfSense amplifier 114 (i.e., node SNS_INP) to equal the voltage at the negative input of BemfSense amplifier 114 (i.e., node SNS_INM).

In one embodiment, an enhanced auto-calibration may be performed to configure the BemfSense amplifier 114 as a comparator. During calibration, the VCM is driven in the CCL with R1 implemented as a resistor tree, thus the resistance tapping is auto incremented till the comparator toggles.

In one embodiment, R1/R2 may be set to be slightly larger than Rs/Rm. This serves two general purposes. First, this configuration avoids marginal stability. Second, this configuration limits the maximum VCM current. The maximum VCM current drive is given by:

$$Imax = \frac{R1}{R1*Rm - R2*Rs} * VelCmdGain*DAC \quad \text{(Eqn. 4)}$$

Accordingly, embodiments of the present disclosure generally provide versatility and allows different predetermined velocity profiles to be executed for either current limiting, programmable current profiles in both polarities for overcoming magnetic latches on the ramp or climbing the ramp, and quick emergency braking or deceleration routines, by means of controlling the DAC, R1 and R2. Accordingly, in one embodiment, the present disclosure provides the ability to quick brake the VCM by setting to a default ratio of R1 and R2 and DAC.

In addition, current limiting control may be achieved by adjusting the R1 to R2 ratio. Variations in Rm across certain temperatures may be achieved by adjusting the R1 to R2 ratio. In one embodiment, automatic R1 and R2 calibration routines may be achieved by comparing SNS_INP and SNS_INM.

Figure 2:
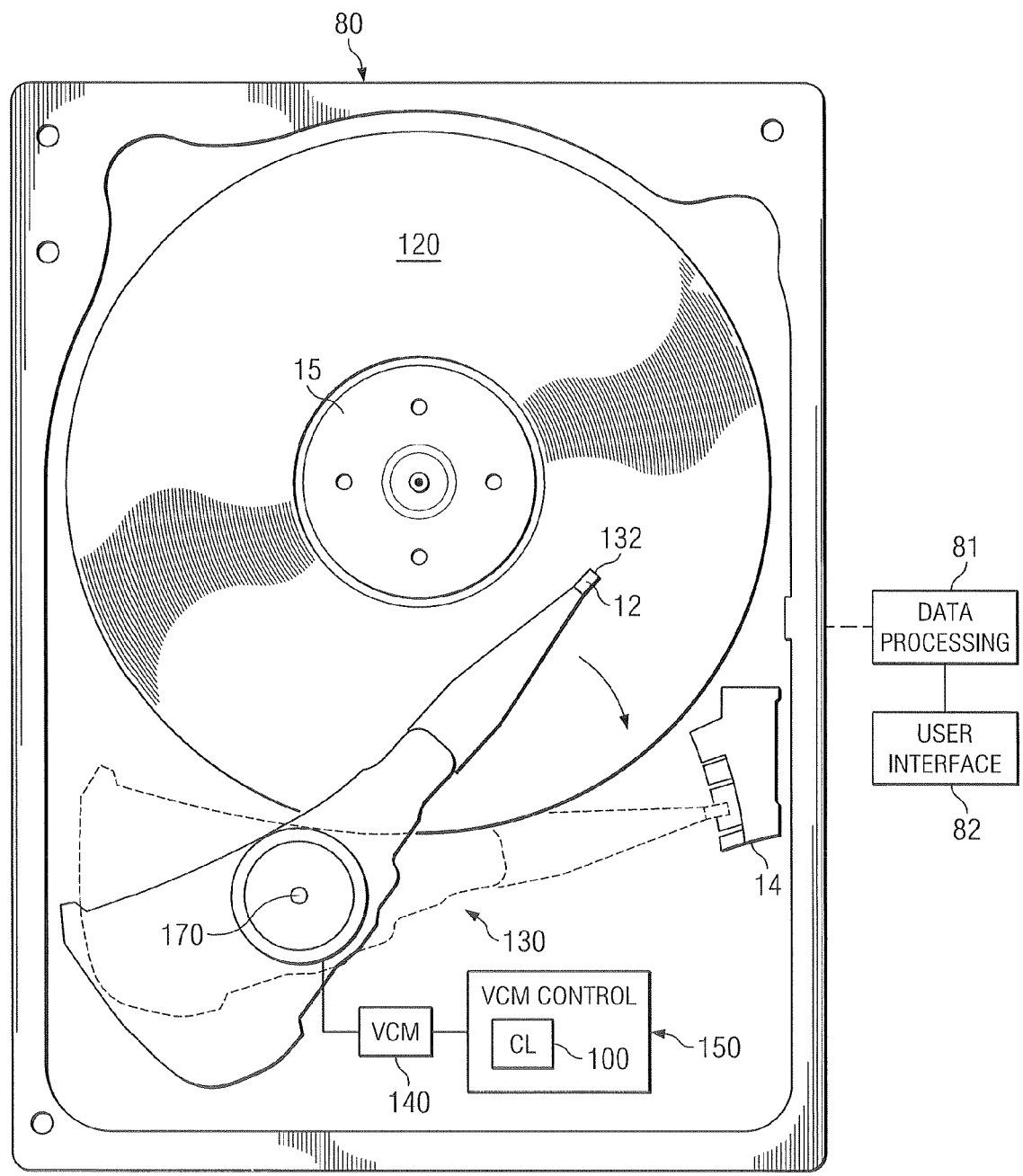
FIG. 2 diagrammatically illustrates exemplary embodiments of a data processing apparatus according to the invention.

FIG. 2 diagrammatically illustrates exemplary embodiments of a data processing apparatus according to the invention. The apparatus of FIG. 2 includes a hard disk drive 80 which includes a ramp 14 arranged outside and near a storage disk 120. During hard disk operation, the VCM arm 130 rotates about shaft 170 to move the read/write head 12 to the required locations on the disk 120. VCM 140, that can be implemented using a conventional voice control motor, known to those of skill in the art, is connected to operate VCM arm 130. A VCM control circuit 150, which includes closed loop (CL) 100 described above, is connected to control VCM 140.

A data processing portion (e.g., a microprocessor device or microprocessor-based circuit) 81 is coupled to the hard disk drive 80 for permitting the data processing portion 81 to store data onto and retrieve data from the data storage disk 120. A user interface 82 is coupled to the data processing portion 81 for permitting communication between the data processing portion 81 and a user. In some embodiments, the user interface can include one or more of a tactile interface, a visual interface and an audio interface. The data processing system of FIG. 2 can be, in some exemplary embodiments, a desktop computer, a notebook computer, a personal digital assistant (PDA), or a digital camera.

During a retraction operation, in some embodiments, the VCM arm 130 rotates about shaft 170 and retracts the read/write head 12 away from the disk 120. A tab 132 slides onto the ramp 14 to position the read/write head 12 in a non-contacting state with respect to the disk 120. In various exemplary embodiments, the hard disk drive 80 can include other various head retraction arrangements, such as those described in U.S. Pat. No. 7,061,707, hereby incorporated by reference.

Figure 3:
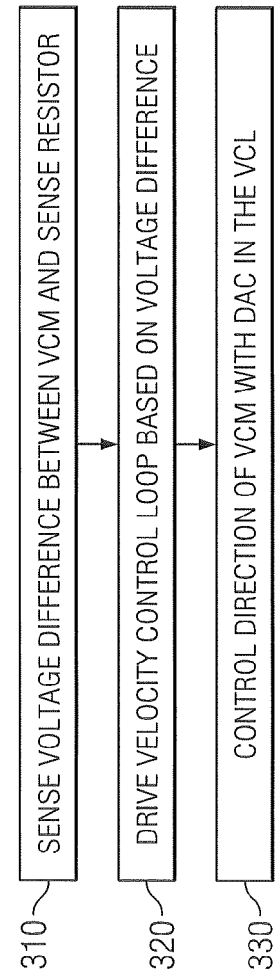
FIG. 3 depicts a flowchart of a process in accordance with a disclosed embodiment.

FIG. 3 depicts a flowchart of a process in accordance with a disclosed embodiment, as described in more detail above.

In step 310, the VCM control circuit, using control loop 100, senses the voltage difference between the VCM and a sense resistor.

In step 320, the VCM control circuit, using control loop 100, drives the velocity control loop based on the sensed voltage difference.

In step 330, the VCM control circuit, using control loop 100, controls the direction of the VCM with a digital-to-analog converter (DAC) in the velocity control loop.

Embodiments of the present disclosure relate to a systems and methods for controlling voice coil motors. In particular, the present disclosure provides a system and method of controlling voice coil motors employing continuous mode velocity control.

In one embodiment, the present disclosure provides a method of controlling the velocity of a voice coil motor (VCM). The method includes sensing a voltage difference between the VCM and a sense resistor and driving a velocity control loop (VCL) based on the voltage difference.

In another embodiment, the present disclosure provides a velocity control circuit incorporating every feature shown and described.

In still another embodiment, the present disclosure provides a method of controlling the velocity of an actuator in a hard disk drive incorporating every feature shown and described.

In yet another embodiment, the present disclosure provides a processing system incorporating every feature shown and described.

In another embodiment, the present disclosure provides a method incorporating every feature shown and described.

Various embodiments enable precise velocity control of the actuator in a hard disk drive (HDD) by controlling the voice coil motor (VCM) during, for example, loading and unloading operations of HDDs with a ramp load feature. The actuator thus transits onto or off the ramp without incurring damage due to crashing against the media or ramp in high speeds. By using a BEMF extraction resistor network and a velocity control loop (VCL), an effective BEMF sensing, a motor resistance sensing and velocity control circuit is formed to drive VCM to a commanded velocity in a quiet and continuous mode.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method of controlling the velocity of a voice coil motor (VCM), the method comprising:
    driving a voice coil motor (VCM) with a current output, wherein the VCM produces a back electromagnetic field (BEMF) voltage output sensed by a BEMF resistive network comprising a first resistor and a second resistor;
    sensing a voltage difference between (i) a junction of a sense resistor connected to the BEMF voltage output and the current output and (ii) a junction of the first resistor and the second resistor; and
    driving a velocity control loop (VCL) connected to control the BEMF voltage output according to the voltage difference.

2. The method of claim 1 further comprising:
    controlling a direction of the VCM with a digital-to-analog converter (DAC) in the VCL.

3. The method of claim 2, wherein a polarity of the DAC controls the direction of the VCM.

4. The method of claim 2, wherein the DAC is programmable to attain a desired VCM velocity.

5. The method of claim 1, wherein the sense resistor comprises a back electromagnetic field (BEMF) resistive circuit.

6. The method of claim 1, wherein the VCL is in a continuous mode.

7. A control loop circuit, comprising:
    a current output connected to drive a voice coil motor, the voice coil motor producing a back electromagnetic field (BEMF) voltage;
    a sense resistor connected to the BEMF output;
    a BEMF resistive network comprising a first resistor and a second resistor; and
    a velocity control loop (VCL) connected to control the voltage output according to a voltage difference between (i) a junction of the sense resistor and the current output and (ii) a junction of the first resistor and the second resistor.

8. The control loop circuit of claim 7, further comprising a digital-to-analog converter (DAC) connected to control a magnitude of the current output.

9. The control loop circuit of claim 7, further comprising a digital-to-analog converter (DAC) connected to control a polarity of the current output.

10. The control loop circuit of claim 9, wherein a polarity of the current output controls the direction of the voice coil motor.

11. The control loop circuit of claim 8, wherein the DAC is programmable to attain a desired voice coil motor velocity.

12. The control loop circuit of claim 7, wherein the VCL is in a continuous mode.

13. The control loop circuit of claim 8, further comprising a velocity command amplifier connected to level-shift and output of the DAC to produce a target voltage.

14. The control loop circuit of claim 7, further comprising first and second driver amplifiers connected to produce the current output.

15. A hard disk drive, comprising:
    a storage disk;
    a voice coil motor (VCM) connected to operate a VCM arm for reading the storage disk; and
    a VCM control circuit including a control loop circuit connected to control the VCM, wherein the control loop circuit includes
        a current output connected to drive the VCM, the VCM producing a back electromagnetic field (BEMF) voltage;
        a sense resistor connected to the BEMF output;
        a BEMF resistive network comprising a first resistor and a second resistor; and
        a velocity control loop (VCL) connected to control the voltage output according to a voltage difference between (i) a junction of the sense resistor and the current output and (ii) a junction of the first resistor and the second resistor.

16. The hard disk drive of claim 15, further comprising a digital-to-analog converter (DAC) connected to control a magnitude of the current output.

17. The hard disk drive of claim 15, further comprising a digital-to-analog converter (DAC) connected to control a polarity of the current output.

18. The hard disk drive of claim 17, wherein a polarity of the current output controls the direction of the VCM.

19. The hard disk drive of claim 16, wherein the DAC is programmable to attain a desired VCM velocity.

20. The hard disk drive of claim 15, further comprising first and second driver amplifiers connected to produce the current output.

* * * * *